United States Patent
Lewis et al.

(10) Patent No.: US 6,582,257 B1
(45) Date of Patent: Jun. 24, 2003

(54) PROPULSION UNIT

(75) Inventors: Clive David Lewis, Rugby (GB); David Christopher Brook, Rugby (GB)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/023,464

(22) Filed: Dec. 17, 2001

(51) Int. Cl.⁷ .................................................. B60L 11/02
(52) U.S. Cl. ........................................................ 440/6
(58) Field of Search .............................................. 440/6

(56) References Cited

U.S. PATENT DOCUMENTS

| | | | |
|---|---|---|---|
| 3,910,542 A | 10/1975 | Bridgnell et al. | |
| 4,004,265 A * | 1/1977 | Woodruff et al. | 367/130 |
| 5,394,039 A | 2/1995 | Suchdev et al. | |
| 5,403,216 A * | 4/1995 | Salmi et al. | 440/53 |
| 6,278,209 B1 | 8/2001 | Rupp et al. | |

FOREIGN PATENT DOCUMENTS

| | | | | |
|---|---|---|---|---|
| EP | 1010614 A1 * | 6/2000 | | B63H/5/125 |
| WO | WO 01/28069 A2 | 9/2000 | | |

* cited by examiner

Primary Examiner—Jesus D. Sotelo
(74) Attorney, Agent, or Firm—Kirschstein, et al.

(57) ABSTRACT

A propulsion unit arranged to propel a waterborne vessel comprising an electric motor arranged to provide propulsion, and a housing arranged to contain the motor. The motor is mounted within the housing on resilient couplings. Such propulsion units are used to propel ships, and the like, and are suspended from beneath the vessel. The resilient couplings reduce the noise emitted by the housing.

25 Claims, 6 Drawing Sheets

PROPULSION UNIT

U.S. GOVERNMENTAL INTEREST

This invention was made with U.S. Government support under contract No. N00024-97-C-4057 awarded by Naval Sea Systems Command. The U.S. Government has certain rights in this invention.

BACKGROUND OF THE INVENTION

This invention relates to an improved propulsion unit, and an improved method of cooling such a propulsion unit.

It is well known to provide propulsion units that are suspended below the hull of a vessel, typically a ship in order to provide the ship with propulsion, and such propulsion units are commonly referred to as PODs. The concept of a POD for ship propulsion has been known for some time (examples are shown in U.S. Pat. No. 5,403,216, and European Patent No. 1 010 614) and is now in common use. In such an arrangement, the propulsion motor, which is generally electrical, is contained in a pod-like housing suspended below the hull of the vessel. The motor is directly connected to one or more propellers at one end, or both ends, of the pod housing. In cases where there is a propeller at only one end, the propeller can be either in front of or behind the pod casing relative to the water flow.

It will be appreciated that as the ship moves, the POD suspended therebelow will experience drag, which will oppose the motion of the ship. There is therefore a desire to reduce the physical dimensions of the POD so as to minimize the drag experienced by the ship. Therefore, PODs generally have minimal access to the insides thereof, and the propulsion motor is generally mounted on, or in close proximity to the wall of the POD. Therefore, vibrations from the propulsion motor are readily transmitted through the wall of the POD, leading to noise being passed from the POD, into the surrounding water.

In many applications, it is desirable to minimize the level of noise transmitted to the surrounding water. A typical application requiring the minimization of noise is for cruise ships that want to travel into environmentally sensitive areas, environmental research vessels, fisheries research vessels, etc. However, it is a problem that known noise isolation systems tend to require an increase in the size of the POD, and that the design of the POD therefore tends to be a compromise between low noise and small size.

SUMMARY OF THE INVENTION

It is an aim of the present invention to overcome, or at least reduce, the problems discussed above.

According to a first aspect of the invention there is provided a propulsion unit arranged to propel a waterborne vessel comprising an electric motor, arranged to provide propulsion, and a housing, arranged to contain the motor, wherein said motor is mounted within said housing on resilient couplings.

An advantage of such an arrangement is that the vibrations from the motor to the housing are significantly reduced and, therefore, the noise emission from the propulsion unit is reduced. Previously, such propulsion units were not fitted with resilient couplings because they entailed making the housing larger (and thus less hydrodynamically efficient), or access to the couplings could not be provided due to the restricted access within the propulsion unit and, therefore, the couplings could not be maintained.

Preferably, the resilient couplings include metallic cushion elements, which are preferably woven metallic cushion elements. Such cushion elements are advantageous because they do not require frequent maintenance. In the most preferred embodiment metallic cushion elements are arranged to stiffen as the deflection of the cushion element increases. Such metallic cushion elements are available from Stop-Choc, of Banbury Ave., Slough, Berks, England.

It will be appreciated that the resilient coupling will have a natural frequency. In the preferred embodiment, the natural frequency of the resilient coupling is roughly at least twice the maximum supply frequency of the electric motor. Such an arrangement is convenient because the electric motor will generate vibrations due to the fundamental component of flux within the motor, which occurs at twice the fundamental supply frequency of the motor. It is advantageous to arrange that the natural frequency of the resilient coupling be greater than twice the maximum supply frequency to ensure that the resilient coupling does not amplify these vibrations, which would occur if the resonant frequency were roughly equal to twice the maximum supply frequency.

Preferably, the resilient coupling has a natural frequency roughly selected to suit the motor. Generally, this will be in the range of between roughly 20 Hz, and roughly 50 Hz. Of course, the resilient coupling may have a natural frequency other than this and may be roughly any one or more of the following (or any value in between): 5 Hz, 10 Hz, 15 Hz, 25 Hz, 30 Hz, 40 Hz, 50 Hz, 75 Hz. It will be appreciated that it is advantageous to have a low natural frequency because the resilient coupling will not attenuate frequencies below the fundamental frequency, and therefore, the higher the fundamental frequency, the less frequencies will be attenuated. However, if the natural frequency of the coupling is too low, then it does not provide enough stiffness, and deflections of the motor on the couplings become too large.

In one embodiment, the motor is an induction motor, although other types of electric motor, such as a synchronous motor, are possible.

The propulsion unit may comprise a pulse width modulated drive unit arranged to supply the motor. Such a drive unit is advantageous because the noise components that it introduces onto the current and voltage it supplies will generally be at a high frequency relative to the resonant frequency of the resilient coupling and such an arrangement is convenient because it allows these noise components to be readily attenuated by the resilient couplings. In general, during normal operation, the largest generation of vibration in the propulsion unit will be due to the non-sinusoidal components in the supply to the motor.

Preferably, the motor is provided with a limiting mechanism, arranged to limit movement of the motor relative to the housing. Such an arrangement is convenient in conditions in which the routine operating conditions of the motor are exceeded, e.g., fault conditions, or an external impact, etc. In such conditions, the resilient coupling may not be able to offer sufficient resistance to the movement of the motor, and thus, the limiting mechanism is desirable to prevent excessive movement of the motor.

The limiting mechanism may comprise a gap of predetermined dimensions between an abutment portion of the motor and an abutment portion of the housing arranged to co-operate with the abutment portion of the motor. Such an arrangement is convenient because it is structurally simple.

In the preferred embodiment the gap is roughly 1.0 to 1.5 mm. However, the gap may be any other suitable dimension, and may be, for example, roughly any one of following, or any dimension between any of the following: 0.5 mm, 1 mm, 2 mm, 3 mm, 4 mm, 5 mm. It will be appreciated that as the size of the gap increases, the more the motor will be allowed to move before its movement is stopped, and further the housing becomes larger to accommodate the extra gap. If the gap is made too small, there is more of a likelihood of the motor touching the housing and, thus, the propulsion unit is likely to emit more noise.

Preferably, a space is defined between the motor and the casing which is arranged to allow for the passage of cooling fluid around the motor. Such an arrangement is convenient because it helps keep the motor cooled. Generally, the fluid will be a gas, and in particular air.

In one embodiment, a plurality of resilient couplings is provided along a side region of the motor. The plurality of resilient couplings may be provided substantially along a line roughly parallel to the longitudinal axis of the motor. Preferably, in such an embodiment at least two lines of resilient couplings are provided, preferably roughly diametrically opposed to one another. Such an arrangement is convenient because it may be more compact than other possible arrangements.

The housing may have extended portions arranged to house the resilient couplings.

An intermediate member may be provided between the housing and the resilient couplings. The intermediate member may comprise a bar running substantially parallel to the axis of the motor. An intermediate member may be advantageous because it may allow for easier alignment of the resilient members with the housing.

In an alternative, and perhaps less preferred embodiment, the resilient couplings may be provided at end regions of said motor. Preferably, a plurality of resilient couplings is provided at each end region thereof. Such an arrangement is convenient because it may provide for easier construction of the propulsion unit, but may result in a larger unit.

BRIEF DESCRIPTION OF THE DRAWINGS

There now follows, by way of example only, a detailed description of embodiments of the present invention of which:

FIG. 2a shows an end elevation of a second embodiment of a propulsion unit according to the present invention;

FIG. 2b shows an end elevation of the arrangement shown in FIG. 2a;

FIG. 3 shows an enlarged detail of a portion of FIG. 1a;

FIG. 4 shows an enlarged detail of a portion of FIG. 2a;

DETAILED DESCRIPTION OF THE PREFERRED EMBODIMENTS

Figures 2A, 2B:
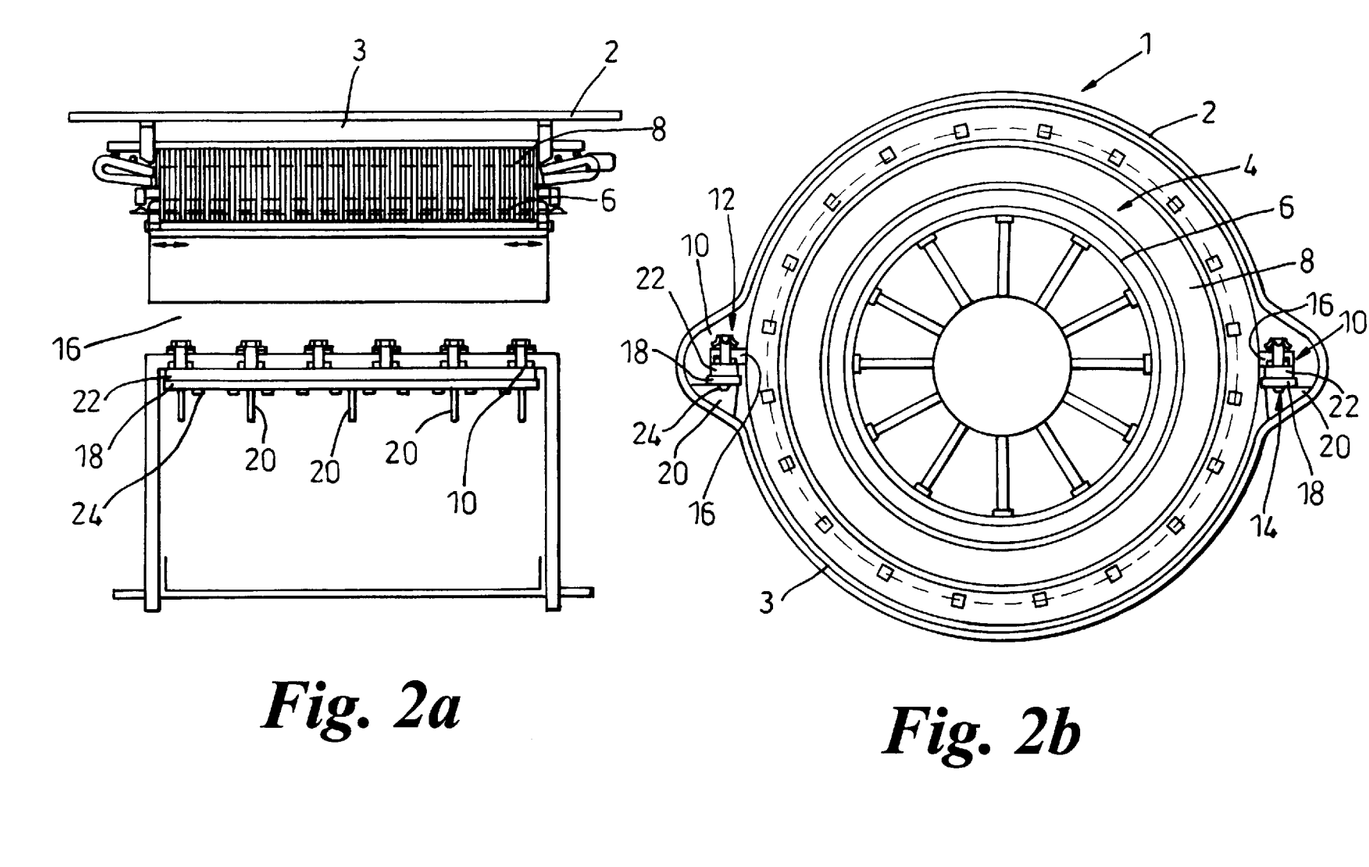

Perhaps the preferred embodiment of this invention is shown in FIG. 2. This shows a section of a propulsion unit 1 (commonly referred to as a POD) having a housing 2 with a motor 4 contained therein. In this embodiment, the motor is an induction motor consisting of a rotor 6, and a stator 8 within the housing 2.

Figure 4:
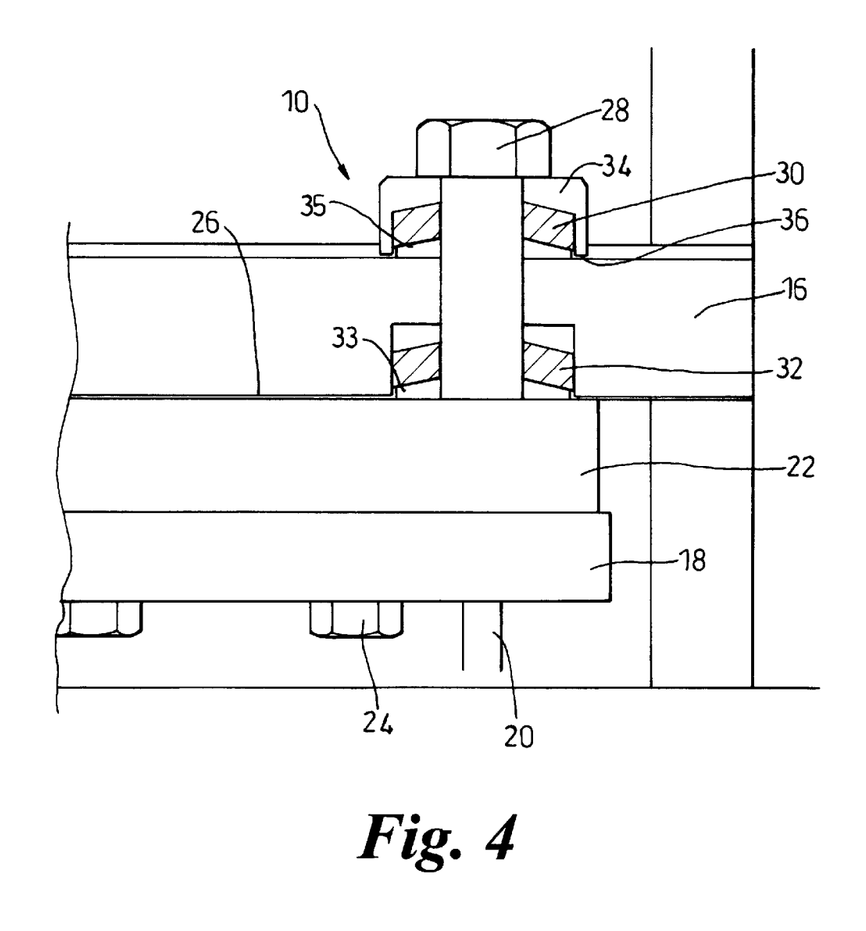

The motor 4 is mounted within the housing 2 on a plurality of resilient couplings 10. A space 3 of substantially annular cross-section is defined between the housing 2 and the stator 8 which can be filled with cooling fluid that circulates round the motor to provide cooling for it. As can be seen from FIG. 2a, six resilient couplings 10 are provided, equi-spaced, along the length of the motor 4 along a line parallel to a longitudinal axis of the motor 4. Two lines 12,14 of resilient couplings 10 are provided diametrically opposite one another relative to the motor (as is best seen in FIG. 2b). An enlargement of the arrangement of the resilient couplings is seen in FIG. 4.

The motor 4 has a foot 16, providing an abutment portion of the motor, extending therefrom substantially along diametrically opposed sides of the motor. The housing 2 has a seating 18, providing an abutment portion of the housing, arranged to co-operate with the motor foot 5. The seating 18 is connected to the housing 2 by a series of webs 20 along its length. An intermediate member 22 is provided between the motor foot 16 and the seating 18, which facilitates assembly of the motor 4 to the housing 2. The intermediate member 22 is securely bolted to the seating 18 by bolts 24.

The resilient couplings 10 maintain the motor 4 in contact with the housing 2, and will now be described with reference to FIG. 4. It will be appreciated that the motor foot 16 should not directly touch the seating 18 in normal operation since this would lead to a direct transmission path for vibrations/noise. Therefore, the resilient couplings 10 are arranged to maintain a gap 26 between the foot 16 and the seating 18. In this embodiment, the gap 26 is arranged to be roughly 1.5 mm.

A bolt 28 engages the intermediate member 22 and locates the motor 4. However, associated with each bolt there is associated a first 30, and a second 32, conical metallic cushion element which ensures that there is no direct contact between the motor 4 and the housing 2. A cap element 34 contacts the first cushion element 30 to spread the torque applied by the tensioned bolt 28 evenly across the cushion element 30. However, it should be noted that there is a gap 36 between the cap element 34 and the foot 16.

The first 30 and second 32 cushion elements are seated upon a mount element 33,35.

In normal operation of the motor 4 within the housing 2, the metallic cushion elements 30, 32 resist the torque of the motor and the gap 26 is maintained between the foot 16 and the seating 18. Therefore, the vibrations generated by the motor 4 are attenuated as described below in relation to FIG. 6, and are not fully passed to the housing 2.

Under fault conditions (e.g., an electrical fault), or shock loading (e.g., an impact of the vessel on which the propulsion unit is mounted) the torque resistance of the cushion members 30,32 may be exceeded. If the torque/force limit is exceeded, the motor 4 will move relative to the housing 2 such that the motor foot 16 comes into contact with the seating 18. The foot 16 and seating 18 can oppose much greater torque/forces and further rotation/translation of the motor 4 relative to the housing 2 is prevented. Once the fault has been cleared, the resilient nature of the cushion members 30, 32 ensures that the motor 4 returns to its original position, restoring the gap 26.

Figures 1A, 1B:
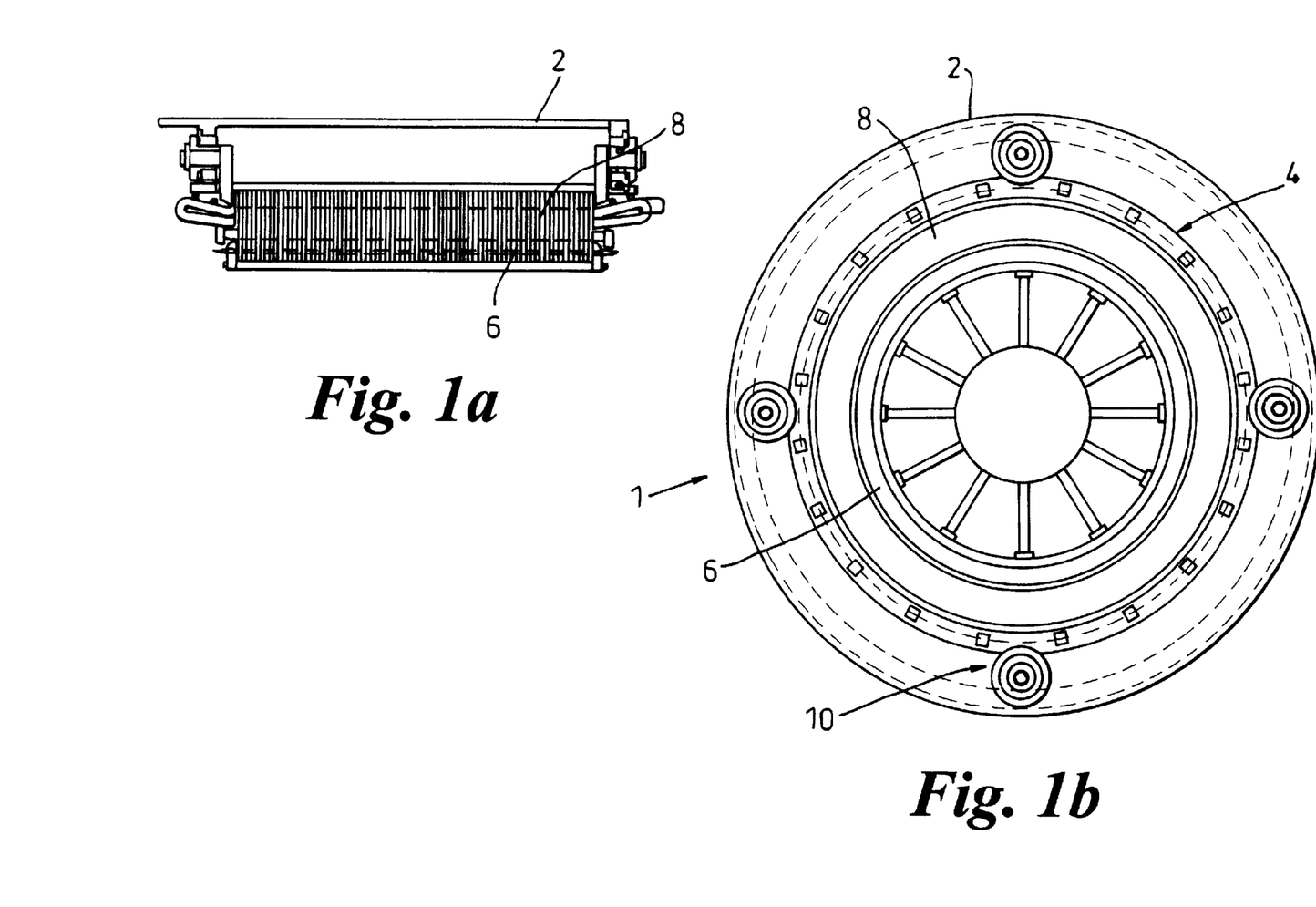
FIG. 1a shows a longitudinal section through a first embodiment of a propulsion unit according to the present invention.
FIG. 1b shows an end elevation of the arrangement shown in FIG. 1.
Figure 3:
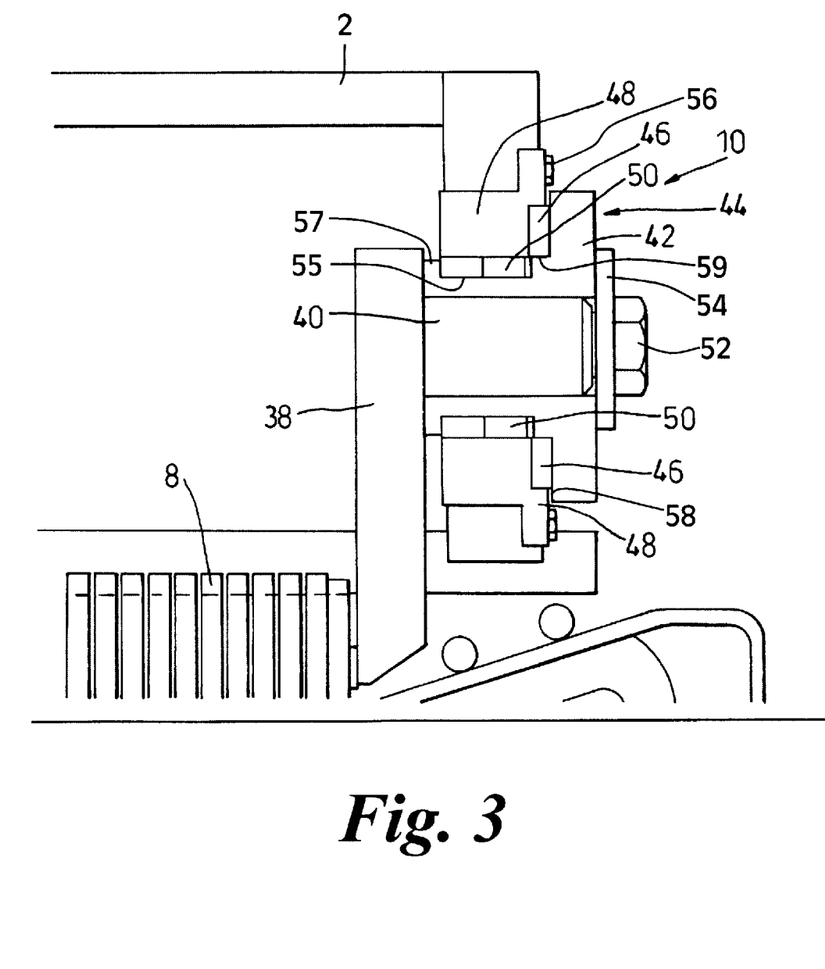

A second embodiment of the invention is described in relation to FIGS. 1a, 1b and 3, and like parts compared to the first embodiment have been described with the same reference numerals. In this embodiment the resilient couplings 10 are provided at end regions of the motor 4, and are arranged at four radial positions at each end of the stator 8. Clearly, the rotor 6 must be free to rotate and is not anchored relative to the housing.

An end plate 38 is securely attached to the stator 8 and has a pin 40 protruding therefrom. A sleeve 42 is provided around the pin 40 and has a region of increased radius 44 at its end region away from the motor 4. An inner face of the region of increased radius 44 is used to abut a number of first metallic cushion elements 46 each being rectangular in cross-section and arranged roughly in a ring around the pin 40. The first cushion element 46 contacts a bush 48, which is bolted to the housing 2. Therefore, the first cushion element 46 axially locates the motor 4 relative to the housing 2. A number of second cushion elements 50, also rectangular in cross-section and arranged roughly around a ring, are provided around the sleeve 42 and abuts an inner surface of the bush 48. Therefore, the second cushion elements locates the motor 4 in a radial direction relative to the housing 2.

Figure 6:
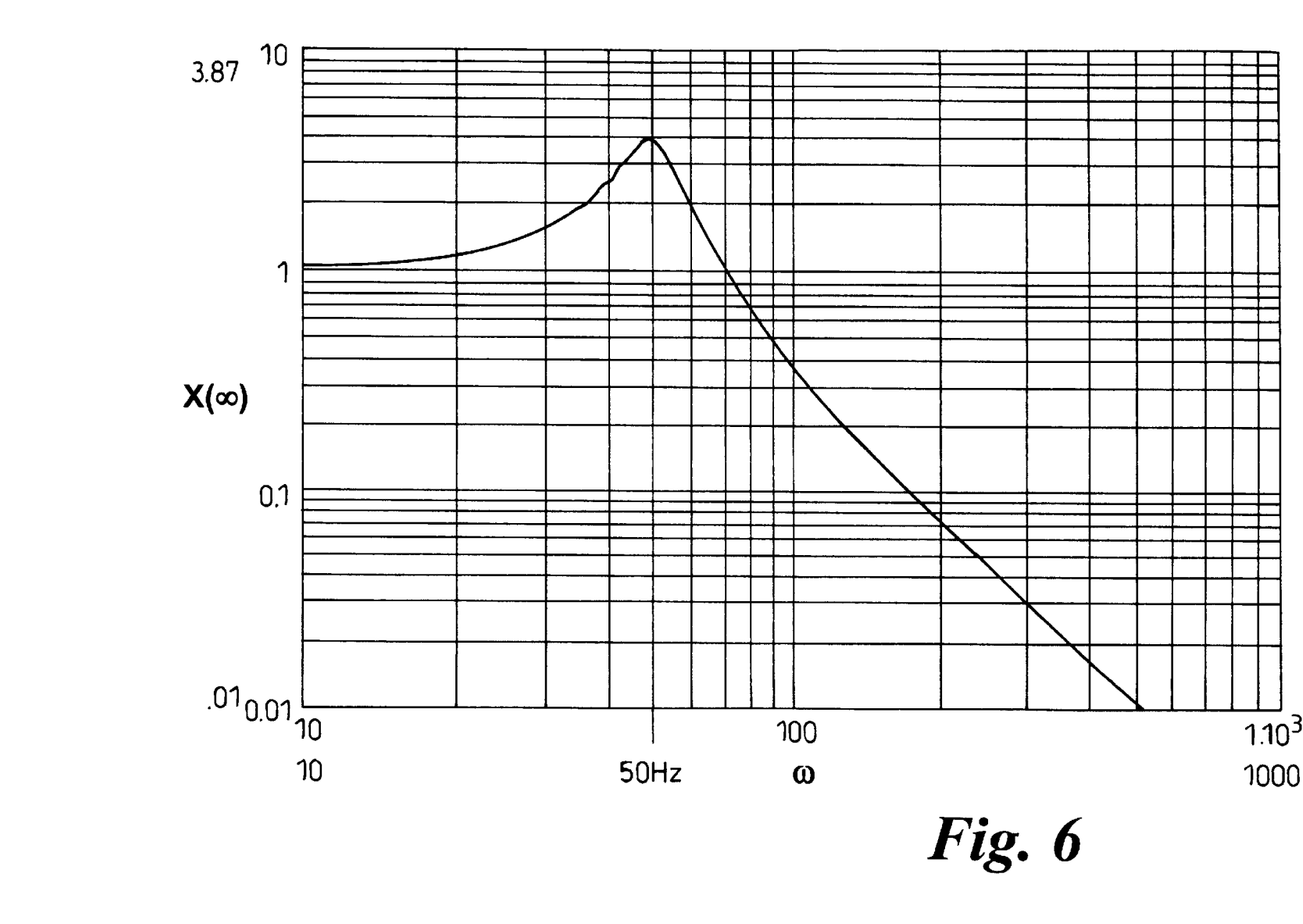
FIG. 6 shows a graph plotting the frequency response of a resilient coupling used in the present invention.

The cushion elements used in the above description are of a Woven metallic nature, and may be obtained from Stop-Choc, of Banbury Ave., Slough, Berks, England. The cushion elements are chosen to have a natural frequency to suit the motor and, in this embodiment, the natural frequency is roughly 50 Hz, which is shown in FIG. 6. It can be seen from the figure that for frequencies of less than 50 Hz, the cushion element passes vibration therethrough and there is no attenuation. Indeed, as the frequency approaches 50 Hz, the natural frequency, the cushion element in fact amplifies the vibration. Therefore, the motor 4 and resilient coupling combination are specified so that significant vibrations from the motor do not occur at the coupling natural frequency.

Figure 5:
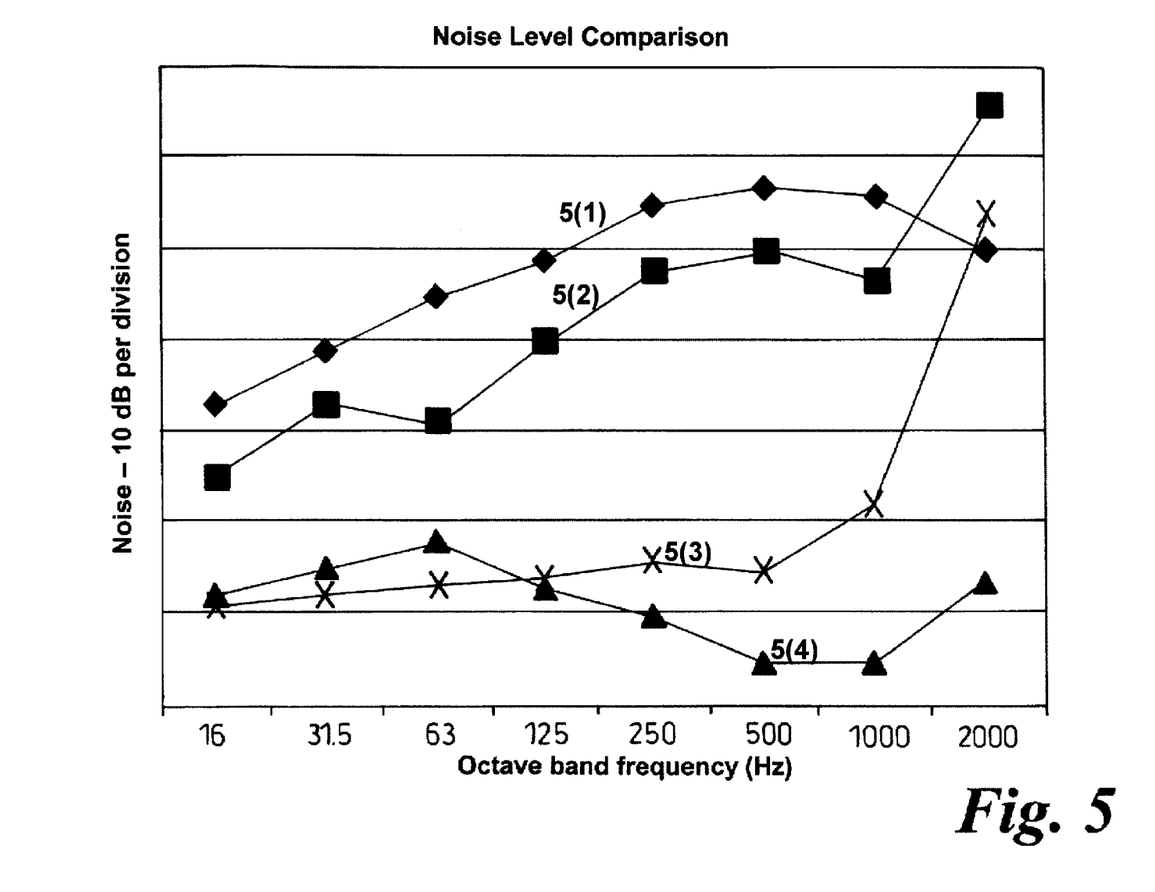
FIG. 5 shows a graph showing the improvements achieved by utilizing the present invention.

FIG. 5 shows a comparison of the noise emitted by prior art propulsion units (PODs), and also by propulsion units utilizing the present invention. The horizontal axis shows frequency, and it can be seen that measurements have been taken at eight octave band frequencies. The vertical axis shows the noise in dB. Four propulsion unit/motor combinations have been measured: a commercially available synchrodrive propulsion unit (or POD) rated at 20 MW; a 20 MW induction motor run from a PWM supply; a 28 MW quiet design motor run from a PWM supply; and the same 28 MW motor fitted into a pod and mounted on resilient couplings. It will be appreciated that the couplings fitted to the arrangement shown in the fourth line have significantly reduced the vibration transmitted to the housing, and thus, will have significantly reduced the noise of the propulsion unit.

Looking at FIG. 5 it will be appreciated that, at high frequencies (as represented by the plot at 2 kHz), the quiet design motor represented by the third line is in fact noisier than the commercially available 20 MW synchrodrive pod represented by the firstline. However, the resilient couplings can readily attenuate vibrations that occur significantly above the natural frequency. Therefore, it does not matter as much that the motor used produces more vibration at high frequency because these can be readily attenuated.

It will be understood that each of the elements described above, or two or more together, also may find a useful application in other types of constructions differing from the types described above.

While the invention has been illustrated and described as embodied in a propulsion unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

We claim:

1. A propulsion unit arranged to propel a waterborne vessel, the unit comprising:
   an electric motor for providing propulsion; a housing for containing the motor, said motor being mounted within said housing on resilient couplings; and a pulse width modulated (PWM) drive unit for supplying the motor.

2. The unit according to claim 1, wherein the resilient couplings include metallic cushion elements.

3. The unit according to claim 1, wherein the resilient couplings include woven metallic cushion elements.

4. The unit according to claim 1, wherein a natural frequency of each resilient coupling is roughly at least twice a maximum supply frequency of the electric motor.

5. The unit according to claim 1, wherein each resilient coupling has a natural frequency in a range of roughly 20 Hz to 50 Hz.

6. The unit according to claim 1, wherein the motor is an induction motor.

7. The unit according to claim 1, wherein the motor is a synchronous motor.

8. The unit according to claim 1, wherein the motor is provided with a limiting mechanism for limiting movement of the motor relative to the housing.

9. The unit according to claim 8, wherein the limiting mechanism comprises a gap of predetermined dimensions between an abutment portion of the motor, and an abutment portion of the housing which cooperates with the abutment portion of the motor.

10. The unit according to claim 9, wherein the gap is between roughly 0.5 mm and roughly 2 mm.

11. The unit according to claim 10, wherein the gap is roughly 1.0 to 1.5 mm.

12. The unit according to claim 1, wherein a space is defined between the motor and the housing, the space allowing a passage of a cooling fluid around the motor.

13. The unit according to claim 1, wherein a plurality of the resilient couplings is provided along a side region of the motor.

14. The unit according to claim 13, wherein the plurality of resilient couplings is provided substantially along a line roughly parallel to a longitudinal axis of the motor.

15. The unit according to claim 14, wherein at least two lines of resilient couplings are provided.

16. The unit according to claim 15, wherein the two lines of resilient couplings are roughly diametrically opposed to one another.

17. The unit according to claim 1, wherein the resilient couplings are provided at end regions of said motor.

18. The unit according to claim 17, wherein a plurality of the resilient couplings is provided at each end region of the motor.

19. The unit according to claim 1, wherein the housing has extended portions for housing the resilient couplings.

20. The unit according to claim 1, wherein an intermediate member is provided between the housing and the resilient couplings.

21. The unit according to claim 20, wherein the intermediate member comprises a bar running substantially parallel to an axis of the motor.

22. A propulsion unit arranged to propel a waterborne vessel, the unit comprising:

an electric motor for providing propulsion, and a housing for containing the motor, said motor being mounted within said housing on resilient couplings, said housing having extended portions for housing the resilient couplings.

23. The unit according to claim 22, and further comprising a pulse width modulated (PWM) drive unit for supplying the motor.

24. A propulsion unit arranged to propel a waterborne vessel, the unit comprising:

an electric motor for providing propulsion; a housing for containing the motor, said motor being mounted within said housing on resilient couplings; and an intermediate member provided between the housing and the resilient couplings, said intermediate member comprising a bar running substantially parallel to an axis of the motor.

25. The unit according to claim 24, and further comprising a pulse width modulated (PWM) drive unit for supplying the motor.

* * * * *